United States Patent [19]

Marini et al.

[11] Patent Number: 5,235,158

[45] Date of Patent: Aug. 10, 1993

[54] DEVICE FOR CONTINUOUS PRODUCTION OF CERAMIC SUPERCONDUCTOR

[75] Inventors: Paolo Marini; Mario Tului; Stefano Fortunati, all of Rome, Italy

[73] Assignee: Centro Sviluppo Materiali SPA, Rome, Italy

[21] Appl. No.: 737,682

[22] Filed: Jul. 30, 1991

[30] Foreign Application Priority Data

Aug. 1, 1990 [IT] Italy .................. 48205 A/90

[51] Int. Cl.$^5$ .................................................. F27B 9/06
[52] U.S. Cl. .................................................. 219/388
[58] Field of Search ............. 219/388, 390; 34/39, 34/41, 112, 208

[56] References Cited

U.S. PATENT DOCUMENTS

| | | | |
|---|---|---|---|
| 784,854 | 3/1905 | Grace | 219/388 |
| 913,760 | 3/1909 | Osborne | 34/112 |
| 1,787,063 | 12/1930 | Cano | 34/208 |
| 2,301,589 | 11/1942 | Shepard | 34/208 |
| 2,414,580 | 1/1947 | Birdseye | 34/208 |
| 4,554,437 | 11/1985 | Wagner | 219/388 |
| 5,023,429 | 6/1991 | Bailey | 219/388 |

*Primary Examiner*—Teresa J. Walberg
*Attorney, Agent, or Firm*—Allegretti & Witcoff, Ltd.

[57] ABSTRACT

A device for the continuous production of ceramic conductors, for example, yttrium, barium and copper oxide type, which includes an endless belt and a tank and conduit for feeding solution from the tank onto the endless belt to form a liquid layer containing the desired proportion of metal ions on the endless belt. The endless belt passes through a furnace where the liquid is evaporated from the liquid layer and the residual metal salts are treated in an oxidizing atmosphere to produce ceramic oxides. A scraper is provided to remove the resulting ceramic oxides from the endless belt.

14 Claims, 1 Drawing Sheet

DEVICE FOR CONTINUOUS PRODUCTION OF CERAMIC SUPERCONDUCTOR

BACKGROUND OF THE INVENTION

Continuous production of ceramic oxide superconductors, for example of the yttrium, barium and copper oxide type (YBCO), is assured by means of a device consisting of the combination in cooperation relationship of: a continuous movable surface, means for feeding a liquid layer containing the desired proportion of metal ions on to said continuous surface, means for evaporating the liquid component of said liquid layer and for hightemperature roasting of the remaining solid residue in an oxidizing environment, and means for removing from said surface the product obtained by said roasting.

The present invention concerns a device for the continuous production of ceramic superconductors. More precisely it concerns the production of ceramic oxide superconductors by means of a device for ensuring a thin-layer pyrolysis of a solution containing ions of the metals which will be part of the desired final ceramic.

Until a few years ago, the use of superconductivity was limited by the cost of the technique, owing to the very low temperatures needed for the phenomenon to occur, typically at around that of liquid helium.

However, practical interest in superconductivity has been greatly aroused by the recent discovery of new classes of materials, especially ceramic oxides, that manifest this property at much higher temperatures which are more economical to attain and maintain, typically around that of liquid nitrogen. However, this interest has been somewhat restrained by the poor availability of ceramic oxide superconductors, essentially due to the unavailability of methods and devices capable of ensuring qualitatively and quantitatively satisfactory production of said materials.

In fact, almost all ceramic oxide superconductor production techniques are excessively costly (as, for instance, the supergrinding of the oxides composing the desired ceramic; the coprecipitation, described inter alia in J. Phys; 30, (1988) L251; the sol-gel method, described for example in ACS Symp. Ser. 351 (1987) ch. 10; or the citrates method, described in J. Phys. D21 (1988) 226), their productivity is not commercially acceptable, their realization can be complex and with unsatisfactory results. Known methods for the continuous production of ceramic oxide superconductors are almost all based on variations of an old process for the production of oxides (U.S. Pat. No. 3,189,550), consisting in atomizing a solution containing the desired mixture of metallic ions in a furnace and then collecting the ensuing powders. A variation consists in directing the jet of ceramic powders thus formed on to a surface to be coated (examples of these techniques are reported in Jap. J. of Appl. Phys. vol. 27, No. 6, pages L1086 to L1088 and pages 1092 to 1093, as well as is vol. 29, No. 1 pages L33 to L35).

The main drawbacks with these continuous techniques concern:

low productivity: the powders produced are normally very fine (around one micron or less) and are very difficult to collect, since—as known—the efficiency of electric filters is less than 70% for such fine particles;

the morphology of the particles, which are generally hollow; hence the bodies produced with them have a low green density (typically less than 60%) making it difficult to ensure that the final dimensions are as desired (see french Patent Appl. No. 2628415)

impossibility of controlling the thermal treatment of the particles because they are produced in a highly turbulent fluid environment.

It is thus evident that present techniques are still not capable of furnishing production systems capable of satisfying the big demand for ceramic oxide superconductor powders which has recently emerged.

The present invention overcomes the difficulties mentioned by supplying a simple, easily-controllable device for the continuous production of ceramic oxide superconductor powders of excellent quality and capable of ensuing compacted products of the maximum possible density right from the green state.

According to the present invention, a device for the continuous production of superconductors, starting from a solution comprising a liquid component in which are dissolved metal ions in the desired proportions, is formed by the combination in cooperation relationship of:

a continuous movable surface, means for feeding a liquid layer of said solution on to said continuous surface, means for evaporating the liquid component from said liquid layer and for treating the residual metal salt in a high-temperature oxidizing environment to give ceramic oxides, means for removing the ensuing ceramic oxides from said continuous surface;

Preferably, said continuous surface is one of the surfaces of an endless metal belt; in order to avoid pollution of the desired product, said surface preferably has a coating that is resistant to high temperatures, preferably oxide-based and inert to said solution containing the metal ions.

A component considered satisfactory for this purpose is magnesium oxide, which can be associated with other oxides to form compounds such as fosterite.

Said surface is made to pass continuously through said means capable of evaporating the liquid component of said liquid layer and oxidizing the remaining solid residue at high temperature, said means consisting preferably of a tubular furnace divided lengthwise into a plurality of zones, each one being provided with its own means for temperature control and monitoring. Said tubular furnace is advantageously heated electrically and can be equipped with means for controlling and monitoring a possible flow of gas through it.

The means for feeding on to said continuous surface a liquid layer containing the ions of metals which must form the oxide superconductors, preferably consist of a tank for a liquid, complete with means for control and monitoring liquid flow towards said continuous surface; to ensure good continuous uniform treatment across the whole width of said surface, the device as per the invention is advantageously equipped with means for ensuring that said layer is of uniform thickness for instance consisting of at least one skimmer blade. Said continuous surface can also be equipped with lengthwise sidestrips to confine said liquid and at least one vertically-adjustable blade set at a distance from said surface such as to determine the desired thickness of said liquid layer; in that case, said blade, or at least the last of these blades, is set at the entrance to said furnace, so that said liquid can be rapidly vaporized before uncontrolled thickness variations occur.

Said means for removing the products of the oxidation which occurs in the furnace from said continuous surface, consist preferably of a scraper bar, set skew to the direction of travel of said surface, which just touches the surface itself. Provision is made for means to collect the product thus obtained; this takes the form of a collection bin positioned beneath said surface at the location of said bar.

BRIEF DESCRIPTION OF THE DRAWING

The present invention will now be described in greater detail in relation to a pilot-scale embodiment illustrated in the accompanying drawing and provided purely by way of example, without in any way limiting the scope and the objects of the invention.

DETAILED DESCRIPTION OF THE INVENTION

Figure 1:
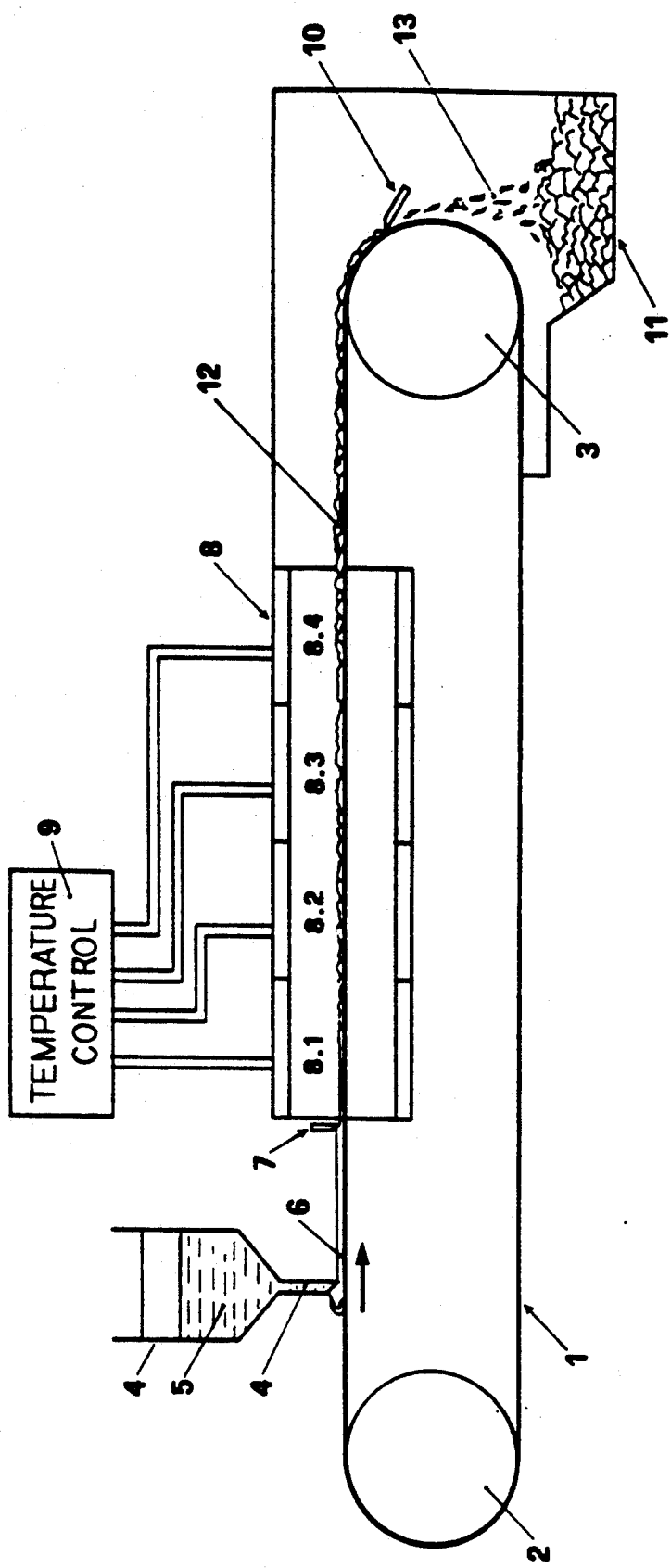
FIG. 1 is a schematic elevation view of the device as per the invention.

An endless metal belt 1 passing around rolls 2 and 3, moves in the direction indicated by the arrow benath tank 4 containing solution 5 having the desired proportions of metal ions which must form the ceramic oxide superconductors by high-temperature oxidation. From tank 4 solution 5 is delivered via conduit 4' to belt 1, where it forms a layer 6 whose thickness is controlled by blade 7. The belt 1, bearing the desired thickness of solution, enters furnace 8, divided in a plurality zones (four in the example illustrated), each appropriately connected to means 9 for temperature control and monitoring.

In the first zone of the furnace, 8.1, the liquid layer is rapidly dried, so as to leave on the belt a mixture of salts of the metal cations contained originally in the solution. in the subsequent zones, 8.2, 8.3 and 8.4, said salts are raised to a temperature between 700° and 1000° C., in a atmosphere containing oxygen, and are thus oxidized. In the case of YBCO, the product obtained is a kind of agglomerated sponge, whose morphology is that of a cross-bedded flake ash, forming a layer 12 which remains adherent to the belt until removed by scraper bar 10, the resulting flakes being collected in bin 11.

It is important to note that this layer has self-coherence and adherence to the belt just sufficient to prevent it from being blown away by the movement of said belt, but not preventing its easy removal by the scraper bar; this characteristic ensures that it can also be stripped from the belt by means of suitably oriented gas jets.

In this way it is possible to collect more than 95% of the product obtained.

In the case of the production of YBCO, carbon contamination of the product obtained is less than 0.2%.

X-Ray examination shows that the YBCO obtained by means of the device as per the present invention is mono-phase (orthorhombic or tetragonal depending on the thermal cycle adopted) and also compacts very readily, furnishing products with a green density of better than 65%.

The pilot line with a 2-m long furnace and a 100-mm wide belt, described by way of example, permits the production of 200 g/h of YBCO at the purity indicated.

We claim:

1. A device for the continuous production of ceramic oxide superconductors starting from a solution comprising a liquid component in which are dissolved metal ions comprising the combination in cooperative relationship of: an endless belt having a movable continuous surface, means for feeding a liquid layer of said solution onto said continuous surface, furnace means for drying said liquid layer and than for high-temperature treating residual metal salts at a temperature on the order of 700°–1000° C. in an oxidizing atmosphere to produce ceramic oxide; and means for removing the resulting ceramic oxides from said continuous surface; said continuous surface of the endless belt having a high-temperature-resistant coating which is inert to the solution containing said metal ions.

2. A device as in claim 1 including a blade for controlling the thickness of the liquid layer of said solution on the endless belt prior to entry of the liquid layer into the furnace means.

3. A device as in claim 1 including a scraper bar for removing the ceramic oxides form the continuous surface.

4. A device as in claim 1 wherein said coating has a magnesium-oxide base.

5. A device as in claim 4 wherein said coating has a fosterite composition.

6. A device as in claim 1 wherein the ceramic oxide superconductor is of the yttrium, barium and copper oxide type having less than 0.2% carbon contamination.

7. Device for the continuous production of ceramic oxide superconductors starting from a solution comprising a liquid component in which are dissolved metal ions, characterized in that it comprises the combination in cooperation relationship of:

a movable continuous surface comprising one of the surfaces of an endless metal belt; means for feeding a liquid layer of said solution onto said continuous surface;

means for evaporating said liquid component from said liquid layer and for high-temperature treating the residual metal salts in an oxidizing atmosphere to produce ceramic oxides; and means for removing the resulting ceramic oxides from sad continuous surface; said surface having a high-temperature-resistant coating which is inert to said solution containing said metal ions.

8. Device as per claim 7 characterized in that said coating has a magnesium-oxide base.

9. Device as per claim 8 characterized in that said coating has a fosterite composition.

10. Device as per claim 7, characterized in that said means for evaporating said liquid component and for high-temperature treatment of the metal salt residues consists of a tubular furnace.

11. Device as per claim 10, characterized in that said furnace is divided lengthwise into a plurality of zones, each complete with its own means for temperature control and monitoring.

12. Device as per claim 11, characterized in that said furnace is electrically powered and is complete with means for controlling and monitoring a flow of gas through it.

13. Device as per claim 7, characterized in that it is provided with means consisting of a skimmer blade for rendering the thickness of the liquid layer uniform.

14. Device for the continuous production of ceramic oxide superconductors starting from a solution comprising a liquid component in which are dissolved metal ions, characterized in that it comprises the combination in cooperation relationship of:

a movable continuous surface;
means for feeding a liquid layer of said solution onto said continuous surface;

means for evaporating said liquid component from said liquid layer and for high-temperature treating the residual metal salts in an oxidizing atmosphere to produce ceramic oxides; and means for removing the resulting ceramic oxides from said continuous surface; characterized in that the device is provided with lengthwise side-strips to confine said liquid layer on said continuous surface and at least one vertically-adjustable blade set at a distance from aid surface such as to determine the thickness of the liquid layer.

* * * * *